United States Patent
Dunshea et al.

(10) Patent No.: US 9,262,274 B2
(45) Date of Patent: Feb. 16, 2016

(54) PERSISTENT DATA ACROSS REBOOTS

(71) Applicant: International Business Machines Corporation, Armonk, NY (US)

(72) Inventors: Andrew Dunshea, Austin, TX (US); Maha Emad, Austin, TX (US); Douglas J. Griffith, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 133 days.

(21) Appl. No.: 14/139,953

(22) Filed: Dec. 24, 2013

(65) Prior Publication Data

US 2015/0178168 A1    Jun. 25, 2015

(51) Int. Cl.
  *G06F 11/00*  (2006.01)
  *G06F 11/14*  (2006.01)

(52) U.S. Cl.
  CPC ........ *G06F 11/1451* (2013.01); *G06F 11/1438* (2013.01)

(58) Field of Classification Search
  USPC ............................................. 714/20, 15, 6.1
  See application file for complete search history.

(56) References Cited

U.S. PATENT DOCUMENTS

| | | | |
|---|---|---|---|
| 7,818,616 B2 | 10/2010 | Kathail et al. | |
| 8,392,695 B1 | 3/2013 | Lachwani et al. | |
| 2003/0014690 A1* | 1/2003 | Frimout | 714/20 |
| 2006/0031717 A1* | 2/2006 | Blanchard et al. | 714/37 |
| 2008/0295081 A1* | 11/2008 | Albot | G06F 11/3688 717/128 |
| 2009/0044051 A1 | 2/2009 | Nellitheertha | |
| 2010/0332906 A1* | 12/2010 | Agrawal et al. | 714/37 |
| 2013/0283281 A1* | 10/2013 | Krajec et al. | 718/102 |

OTHER PUBLICATIONS

IBM, Firmware Assisted Dump in a Partitioned Environment using Reserved Partition Memory, ID:IPCOM000166859D, Publisher: Ip.com, Date: Jan. 25, 2008.

* cited by examiner

*Primary Examiner* — Sarai Butler

(74) *Attorney, Agent, or Firm* — Terrile, Cannatti, Chambers & Holland, LLP; Stephen A. Terrile

(57) ABSTRACT

A method, system and computer-usable medium are disclosed for persisting Lightweight Memory Trace (LMT) data across reboots of a system. One or more LMT traces are stored in a predetermined pinned memory area with a server's operating system (OS) through a system reboot. A pointer to each LMT is likewise stored in nonvolatile storage (NVS) at a known memory location. The pointers in NVS point to a page which describes where the LMT trace and other kernel structures are in real memory. During initialization, the OS guards these preserved pages to prevent them from being used. By keeping the current and prior address within NVS, the current LMT and prior traces can be retrieved and processed to determine the cause of the system reboot.

17 Claims, 2 Drawing Sheets

PERSISTENT DATA ACROSS REBOOTS

BACKGROUND OF THE INVENTION

1. Field of the Invention

The present invention relates in general to the field of computers and similar technologies, and in particular to software utilized in this field. Still more particularly, it relates to a method, system and computer-usable medium for persisting Lightweight Memory Trace (LMT) data across reboots of a system.

2. Description of the Related Art

Known distributed computer systems typically include multiple computers such as application servers, e-commerce servers, web servers, database servers, and other servers. A web server interfaces to client computers via the Internet to provide various services to client computers. An e-commerce server is a web server that enables advertising, information about products, and the sale of products via the web. Other types of application servers interface to client computers via some type of network, such as the Internet, to make its associated applications available to client computers. Often times, a web server or other type of application server accesses a database server to obtain data such as web pages needed by client computers.

During the course of their operations, these various servers may experience a malfunction that requires rebooting the system to resolve. For example, a server may suddenly experience a thousand or more processes running simultaneously as a result of not being able to reach a target device. Once the system is rebooted, the processes are no longer running and the server is performing normally. However, determining the cause of the problem can often be challenging.

One approach to addressing this issue is analysis of information contained in a system dump, which typically consists of the recorded state of the working memory of a server at the time it functioned. While many server operating systems (OSs) provide a method to perform a full system dump, one may not have been performed prior to rebooting the server. There may be several reasons for this, such as the additional time required, the operator's inexperience in doing so, lack of documented procedures, or the reboot was automatically initiated at an application's request.

SUMMARY OF THE INVENTION

A method, system and computer-usable medium are disclosed for persisting Lightweight Memory Trace (LMT) data across reboots of a system. In various embodiments, one or more LMT traces are stored in a predetermined pinned memory area with a server's operating system (OS) through a system reboot. In these embodiments, a pointer to each LMT is respectively generated and then stored in nonvolatile storage (NVS) at a known memory location. These pointers include the address of the LMT trace and other core kernel structures need to be preserved.

During initialization, the OS, or a hypervisor, guards these preserved pages to prevent them from being used. Once the OS has set up new LMT trace buffers, a real page is set up with the current trace real memory address of the LMT and other core kernel structures. Once the existing NVS pointers have been copied to the prior NVS location, the address of this real page is then likewise stored in NVS. By keeping the current and prior addresses within NVS, the current LMT trace can subsequently be retrieved in the case of a reboot. Further, in the case of a system dump, the ability to collect both the current and prior LMT traces with core kernel structures is enabled.

In various embodiments, the check for an existing LMT trace would be made very early during a system reboot, prior to memory being initialized or basic OS structures being allocated. The pointers in NVS would point to a page which describes where the LMT trace and other kernel structures are in real memory. In these embodiments, the pointers stored in NVS are used to retrieve current and prior LMT data, which is subsequently processed to determine the cause of the system reboot.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
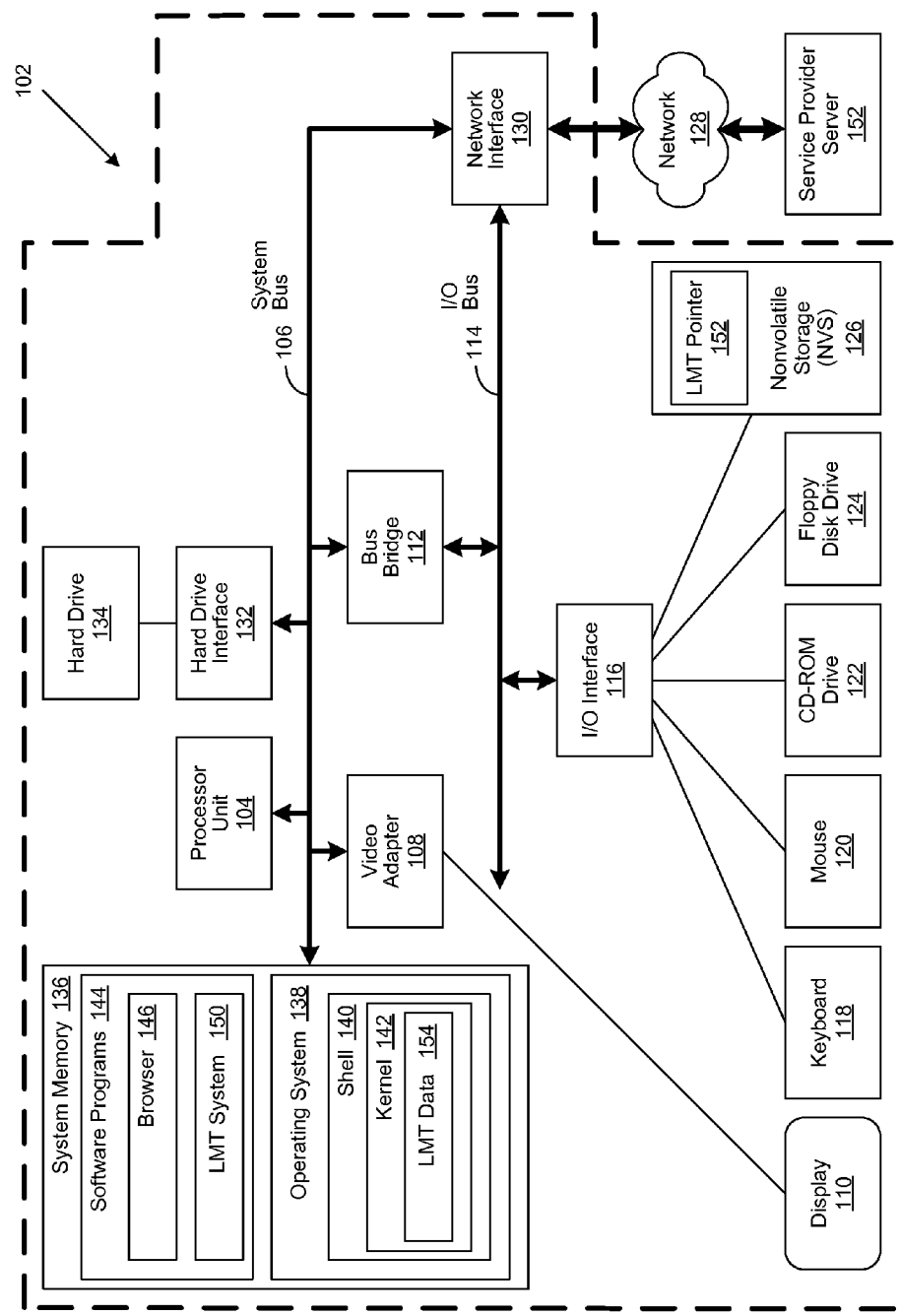
FIG. 1 depicts an exemplary client computer in which the present invention may be implemented.

A method, system and computer-usable medium are disclosed for persisting Lightweight Memory Trace (LMT) data across reboots of a system. As will be appreciated by one skilled in the art, the present invention may be embodied as a method, system, or computer program product. Accordingly, embodiments of the invention may be implemented entirely in hardware, entirely in software (including firmware, resident software, micro-code, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a block diagram of an exemplary client computer 102 in which the present invention may be utilized. Client computer 102 includes a processor unit 104 that is coupled to a system bus 106. A video adapter 108, which controls a display 110, is also coupled to system bus 106. System bus 106 is coupled via a bus bridge 112 to an Input/Output (I/O) bus 114. An I/O interface 116 is coupled to I/O bus 114. The I/O interface 116 affords communication with various I/O devices, including a keyboard 118, a mouse 120, a Compact Disk-Read Only Memory (CD-ROM) drive 122, a floppy disk drive 124, and non-volatile storage (NVS) 126. In various embodiments, the NVS 126 may include one or more Lightweight Memory Trace (LMT) pointers 152 as described in greater detail herein. The format of the ports connected to I/O interface 116 may be any known to those skilled in the art of computer architecture, including but not limited to Universal Serial Bus (USB) ports.

Client computer 102 is able to communicate with a service provider server 152 via a network 128 using a network interface 130, which is coupled to system bus 106. Network 128 may be an external network such as the Internet, or an internal network such as an Ethernet Network or a Virtual Private Network (VPN). Using network 128, client computer 102 is able to use the present invention to access service provider server 152.

A hard drive interface 132 is also coupled to system bus 106. Hard drive interface 132 interfaces with a hard drive 134.

In a preferred embodiment, hard drive 134 populates a system memory 136, which is also coupled to system bus 106. Data that populates system memory 136 includes the client computer's 102 operating system (OS) 138 and software programs 144.

OS 138 includes a shell 140 for providing transparent user access to resources such as software programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, the present invention can also support other user interface modes, such as graphical, voice, gestural, etc.

As depicted, OS 138 also includes kernel 142, which includes lower levels of functionality for OS 138, including essential services required by other parts of OS 138 and software programs 144, including memory management, process and task management, disk management, and mouse and keyboard management. In various embodiments, the kernel 142 includes Lightweight Memory Trace (LMT) data 154, which is stored in a pinned memory area as described in greater detail herein.

Software programs 144 may include a browser 146, which includes program modules and instructions enabling a World Wide Web (WWW) client (i.e., client computer 102) to send and receive network messages to the Internet using Hyper-Text Transfer Protocol (HTTP) messaging, thus enabling communication with service provider server 152. In various embodiments, software programs 144 may also include a Lightweight Memory Trace (LMT) system 150. In these and other embodiments, the LMT system 150 includes code for implementing the processes described hereinbelow. In one embodiment, client computer 102 is able to download the LMT system 150 from a service provider server 152.

The hardware elements depicted in client computer 102 are not intended to be exhaustive, but rather are representative to highlight components used by the present invention. For instance, client computer 102 may include alternate memory storage devices such as magnetic cassettes, Digital Versatile Disks (DVDs), Bernoulli cartridges, and the like. These and other variations are intended to be within the spirit, scope and intent of the present invention.

Figure 2:
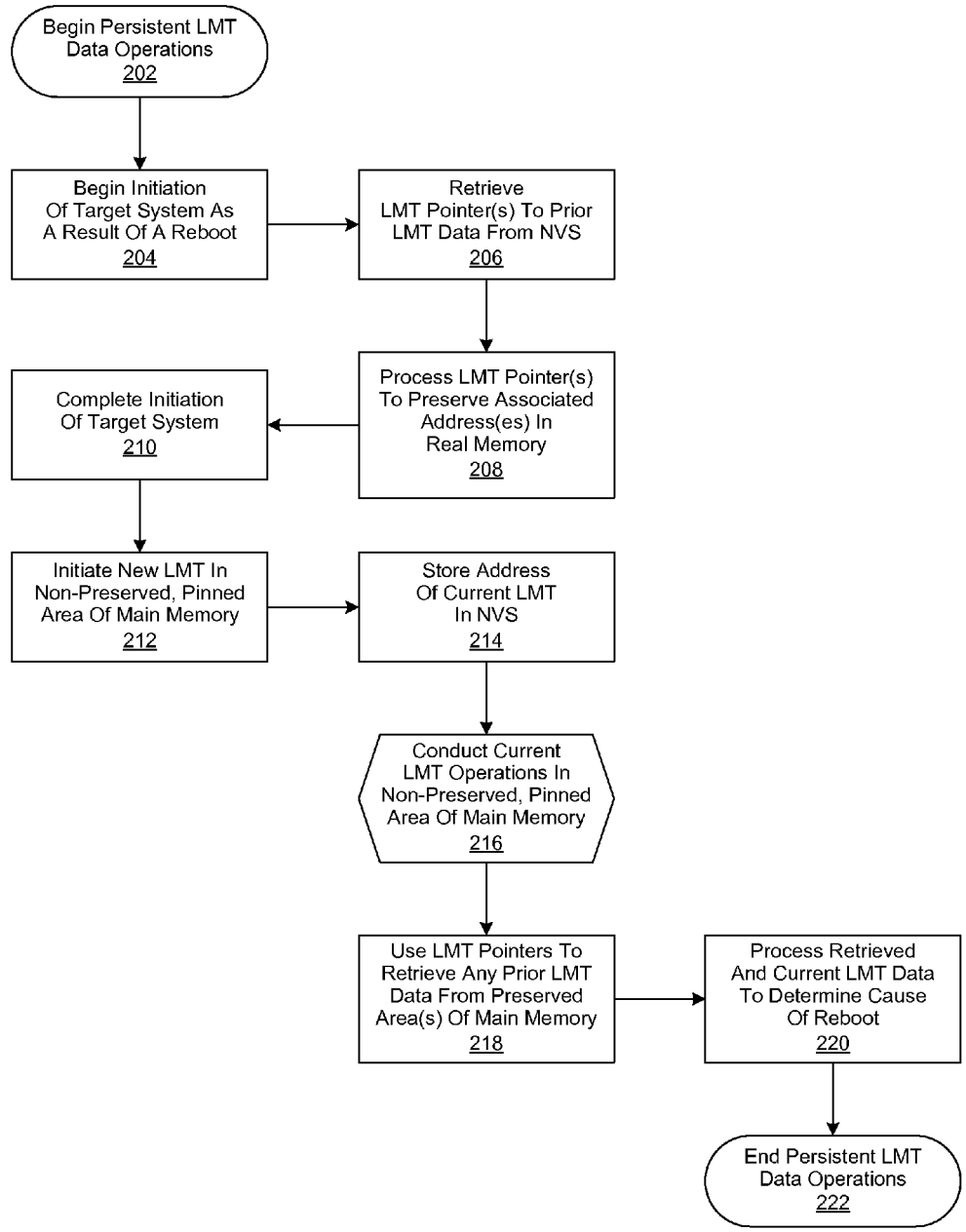
FIG. 2 is a generalized flowchart of the performance of operations for persisting Lightweight Memory Trace (LMT) data across reboots of a system.

FIG. 2 is a generalized flowchart of the performance of operations implemented in accordance with an embodiment of the invention to persist Lightweight Memory Trace (LMT) data across reboots of a system. As used herein, an LMT broadly refers to a constant kernel trace process that records software events occurring during system life. In various embodiments, an LMT is activated by a system (e.g., a server) at initialization. Thereafter, memory tracing runs continuously and recorded events are saved into per-processor memory trace buffers. Typically, there are two memory trace buffers for each processor, one to record common events, and one to record rare events. The memory trace buffers can either be extracted from system dumps or accessed on a live system by service personnel.

In these embodiments, the LMT provides in-memory kernel trace information for First Failure Data Capture (FFDC), which refers herein to a mechanism in which the server's Central Processing Unit (CPU) reports hardware errors to the operating system. In various embodiments, these hardware errors may include system bus errors, Error Correction Code (ECC) errors, parity errors, cache errors, and translation lookaside buffer errors.

While implementation of an LMT requires the consumption of a small amount of pinned kernel memory, its value comes from being able to view some history of what the system was doing prior to reaching the point where a failure is detected. As previously mentioned, each CPU has a memory trace buffer for "common" events, and a smaller memory trace buffer for "rare" events. In various embodiments, the "common" buffer may have a one to two second retention (i.e., enough space to record events occurring during the last one to two seconds without wrapping), while the "rare" buffer may have an hour's retention. It will be appreciated that the actual amount of retention may be dependent upon workload, where developers place "trace hook" calls in the kernel source code, and upon which parameters they decide to trace.

In various embodiments, one or more LMT traces are stored in a predetermined pinned memory area with a server's operating system (OS) through a reboot. As used herein, pinned memory refers to a memory area of an OS that is never swapped to secondary storage. Other known terms for pinned memory are locked, fixed or wired pages. Skilled practitioners of the art will be aware that interrupt mechanisms typically rely upon an array of pointers to their handlers, such as I/O completion and page fault. If the pages containing these pointers or the code that they invoke were pageable, interrupt-handling would become far more complex and time-consuming, particularly in the case of page fault interruptions. Hence, some part of the page table structures is not pageable. Certain of these pages may be pinned for short periods of time, others may be pinned for long periods of time, and still others may be permanently pinned. In various embodiments, the pinning of real memory is performed by a hypervisor during system initiation. As likewise used herein, a system reboot refers to a "warm" or "soft" reboot, where power to the system is not lost as it is in a "cold" or "hard" reboot.

In various embodiments, a pointer to each LMT is generated and then stored in nonvolatile storage (NVS) at a known memory location. As used herein, NVS broadly refers to computer memory that can retain stored information even when not powered. Examples of non-volatile memory include read-only memory, flash memory, static random access memory (SRAM), ferroelectric random access memory (F-RAM), most types of magnetic computer storage devices (e.g. hard disks, magnetic tape, etc.), and optical discs. In certain of these embodiments, the known memory location includes a magic number. As used herein, the term "magic number" refers to a distinctive, unique value that is unlikely to be mistaken for other meanings (e.g., Globally Unique Identifiers), or alternatively, a unique value which could be replaced with a named constant.

In these embodiments, well known pinned memory areas within the operating system are preserved across a reboot to retain prior LMT traces. Skilled practitioners of the art will recognize that the retention of such prior LMT traces can be useful as they record trace information from the operating system at well-known code points in the OS. This information is frequently sufficient to determine the likely cause of an issue causing a system reboot in the absence of a system dump. For example, the prior LMT traces could be retrieved and assist in determining the state of the system prior to it being rebooted. In many cases, such LMT information would provide insight and understanding of the problem which led to a system reboot. As another example, access to both the current and prior LMT traces would be available if a forced system dump is initiated by the operating system. It will be appreciated that having access to more than one instance of a problem often assists in performing root cause analysis, particularly when determining whether the problem is the same or has reoccurred. As yet another example, trace evidence of a system reboot initiated by an application would be captured and available for subsequent retrieval.

In various embodiments, a real address pointer to a real page in memory is stored in NVS. This pointer includes the address of the LMT trace and other core kernel structures need to be preserved. During initialization, the OS, or a hypervisor, would guard these preserved pages to prevent them from being used. In these embodiments, such memory preservation is performed in the case of a system reboot, where the same system resources are used (e.g., same memory, processors, etc.). Once the OS has set up new LMT trace buffers, a real page would be set up with the current trace real memory address of the LMT and other core kernel structures. Once the existing NVS pointers have been copied to the prior NVS location, the address of this real page would then be likewise stored in NVS.

By keeping the current and prior address within NVS, the current LMT trace can subsequently be retrieved in the case of a reboot. Further, in the case of a system dump, the ability to collect both the current and prior LMT traces with core kernel structures is enabled. In various embodiments, the decision to keep a prior LMT trace within the OS instance is tunable (e.g., "on" or "off"). In certain embodiments the decision to keep such prior LMT traces is automatically set based upon the size of pinable memory available to the OS.

In various embodiments, the check for an existing LMT trace would be made very early during a system reboot, prior to memory being initialized or basic OS structures being allocated. The pointers in NVS would point to a page which describes where the LMT trace and other kernel structures are in real memory as well as a sequence of bytes, which would serve as a "magic number" to be sure that this is a valid page describing the locations of the LMT trace and core kernel structures.

From the foregoing, it will be appreciated that the preservation of the LMT trace from a prior instance can be interpreted without other core instance attributes or state. Since modern systems typically have a large amount of memory available, the increased memory footprint required by the invention would be negligible in most cases. Within the context of system virtualization, it would also be possible to preserve the memory region by providing alternative physical memory in various environments if no reduction in memory could or would be acceptable. Because interpretation of the LMT trace does not require any state information from the instance, a hypervisor is used in certain embodiments to provide read access to the protected LMT trace. It will be appreciated that doing so in these embodiments could minimize the overhead and work involved in protecting these pinned regions of memory within the OS. For example, the OS could use the memory space given for the LMT trace and the hypervisor would manage the protection and access across OS instances.

Referring now to FIG. 2, persistent LMT operations are begun in step 202, followed by the initiation of a target system in step 204 as a result of a system reboot described in greater detail herein. Then, in step 206, one or more pointers to prior LMT data residing in a pinned area of main memory, likewise described in greater detail herein, are retrieved from NVS.

The one or more LMT pointers are then respectively processed in step 208 to preserve their associated LMT memory addresses in real memory. The initiation of the target system is then completed in step 210.

Thereafter, a new LMT is initiated in step 212, using a non-preserved, pinned area of real memory. The address of the current LMT is then stored in NVS in step 214. Current LMT operations are then performed in the non-preserved, pinned area of real memory in step 216. Then, in step 218, the various LMT pointers stored in NVS are used to retrieve any prior LMT data from the preserved, pinned areas of real memory. The retrieved and current LMT data is then processed in step 220 to determine the cause of the system reboot, followed by persistent LMT data operations being ended in step 222.

Although the present invention has been described in detail, it should be understood that various changes, substitutions and alterations can be made hereto without departing from the spirit and scope of the invention as defined by the appended claims.

What is claimed is:

1. A computer-implemented method for preserving a predetermined memory region during a reboot, comprising:
   storing a first set of dynamically-generated data in a first predetermined area of real memory;
   generating a first pointer to the first predetermined area of real memory;
   storing the first pointer in nonvolatile storage; and
   protecting the first predetermined area of real memory during a first system reboot process by allocating a first different area of real memory for performing a first set of reboot-related operations; and wherein
   the first set of dynamically-generated data comprises a first set of Lightweight Memory Trace (LMT) data, the LMT data providing data relating to a constant kernel trace process that records events occurring during system life.

2. The method of claim 1, further comprising:
   using the first pointer to retrieve the first set of dynamically-generated data; and
   processing the first set of dynamically-generated data to determine the cause of the first system reboot.

3. The method of claim 2, further comprising:
   storing a second set of dynamically-generated data in a second predetermined area of real memory, the second set of dynamically-generated data comprising a second set of LMT data generated subsequent to performing the first set of reboot-related operations;
   generating a second pointer to the second predetermined area of real memory; and
   storing the second pointer in nonvolatile storage.

4. The method of claim 3, further comprising:
   using the first and second pointers to respectively retrieve the first and second sets of dynamically-generated data; and
   processing the first and second sets of dynamically-generated data to determine the cause of the system reboot.

5. The method of claim 4, further comprising:
   protecting the second predetermined area of real memory during a second system reboot process by allocating a second different area of real memory for performing a second set of reboot-related operations.

6. A system comprising:
   a processor;
   a data bus coupled to the processor; and
   a computer-usable medium embodying computer program code, the computer-usable medium being coupled to the data bus, the computer program code used for preserving a predetermined memory region during a reboot and comprising instructions executable by the processor and configured for:
   storing a first set of dynamically-generated data in a first predetermined area of real memory;
   generating a first pointer to the first predetermined area of real memory;
   storing the first pointer in nonvolatile storage; and
   protecting the first predetermined area of real memory during a first system reboot process by allocating a first different area of real memory for performing a first set of reboot-related operations; and wherein
   the first set of dynamically-generated data comprises a first set of Lightweight Memory Trace (LMT) data, the LMT data providing data relating to a constant kernel trace process that records events occurring during system life.

7. The system of claim 6, further comprising:
   using the first pointer to retrieve the first set of dynamically-generated data; and
   processing the first set of dynamically-generated data to determine the cause of the first system reboot.

8. The system of claim 7, further comprising:
   storing a second set of dynamically-generated data in a second predetermined area of real memory, the second set of dynamically-generated data comprising a second set of LMT data generated subsequent to performing the first set of reboot-related operations;
   generating a second pointer to the second predetermined area of real memory; and
   storing the second pointer in nonvolatile storage.

9. The system of claim 8, further comprising:
   using the first and second pointers to respectively retrieve the first and second sets of dynamically-generated data; and
   processing the first and second sets of dynamically-generated data to determine the cause of the system reboot.

10. The system of claim 9, further comprising:
    protecting the second predetermined area of real memory during a second system reboot process by allocating a second different area of real memory for performing a second set of reboot-related operations.

11. A non-transitory, computer-readable storage medium embodying computer program code, the computer program code comprising computer executable instructions configured for:
    storing a first set of dynamically-generated data in a first predetermined area of real memory;
    generating a first pointer to the first predetermined area of real memory;
    storing the first pointer in nonvolatile storage; and
    protecting the first predetermined area of real memory during a first system reboot process by allocating a first different area of real memory for performing a first set of reboot-related operations; and wherein
    the first set of dynamically-generated data comprises a first set of Lightweight Memory Trace (LMT) data, the LMT data providing data relating to a constant kernel trace process that records events occurring during system life.

12. The non-transitory, computer-readable storage medium of claim 11, further comprising:
    using the first pointer to retrieve the first set of dynamically-generated data; and
    processing the first set of dynamically-generated data to determine the cause of the first system reboot.

13. The non-transitory, computer-readable storage medium of claim 12, further comprising:

storing a second set of dynamically-generated data in a second predetermined area of real memory, the second set of dynamically-generated data comprising a second set of LMT data generated subsequent to performing the first set of reboot-related operations;

generating a second pointer to the second predetermined area of real memory; and storing the second pointer in nonvolatile storage.

14. The non-transitory, computer-readable storage medium of claim 13, further comprising:

using the first and second pointers to respectively retrieve the first and second sets of dynamically-generated data; and processing the first and second sets of dynamically-generated data to determine the cause of the system reboot.

15. The non-transitory, computer-readable storage medium of claim 14, further comprising:

protecting the second predetermined area of real memory during a second system reboot process by allocating a second different area of real memory for performing a second set of reboot-related operations.

16. The non-transitory, computer-readable storage medium of claim 11, wherein the computer executable instructions are deployable to a client system from a server system at a remote location.

17. The non-transitory, computer-readable storage medium of claim 11, wherein the computer executable instructions are provided by a service provider to a user on an on-demand basis.

* * * * *